US012192106B2

United States Patent
Kwon et al.

(10) Patent No.: US 12,192,106 B2
(45) Date of Patent: *Jan. 7, 2025

(54) OPENFLOW BASED DISTRIBUTED ANTENNA SYSTEM POLICY ROUTING METHOD

(71) Applicant: SOLiD Inc., Seongnam-si (KR)

(72) Inventors: Dong Hee Kwon, Seongnam-si (KR); Hoo Pyo Hong, Seongnam-si (KR); Young Man Cho, Seoul (KR)

(73) Assignee: SOLID Inc., Seongnam-si (KR)

( * ) Notice: Subject to any disclaimer, the term of this patent is extended or adjusted under 35 U.S.C. 154(b) by 36 days.

This patent is subject to a terminal disclaimer.

(21) Appl. No.: 17/576,957

(22) Filed: Jan. 16, 2022

(65) Prior Publication Data
US 2022/0141142 A1    May 5, 2022

Related U.S. Application Data

(60) Division of application No. 17/026,314, filed on Sep. 21, 2020, now Pat. No. 11,252,092, which is a
(Continued)

(30) Foreign Application Priority Data

Sep. 29, 2017    (KR) .......................... 10-2017-0127921

(51) Int. Cl.
*H04L 47/20*            (2022.01)
*H04B 7/022*            (2017.01)
(Continued)

(52) U.S. Cl.
CPC .............. *H04L 47/20* (2013.01); *H04B 7/022* (2013.01); *H04L 41/0803* (2013.01);
(Continued)

(58) Field of Classification Search
CPC . H04L 47/20; H04L 41/0803; H04L 41/0893; H04L 45/02; H04L 45/302;
(Continued)

(56) References Cited

U.S. PATENT DOCUMENTS

2008/0101231 A1*  5/2008  Lai ....................... H04L 47/2466
                                                                    370/395.42
2013/0343755 A1    12/2013  Cvijetic
(Continued)

FOREIGN PATENT DOCUMENTS

JP      2011-526095 A      9/2011
JP      2017-046113 A      3/2017
(Continued)

OTHER PUBLICATIONS

Partial European Search Report mailed Feb. 25, 2019 for European Application No. 18197264.7.
(Continued)

*Primary Examiner* — Hardikkumar D Patel
(74) *Attorney, Agent, or Firm* — Insight Law Group, PLLC; Seung Lee

(57) ABSTRACT

Disclosed is an OpenFlow based distributed antenna system (DAS) policy routing method. The DAS policy routing method includes: extracting, by a DAS unit, a match field from header information of a received frame; and comparing, by the DAS unit, the extracted match field with a matching rule of a forwarding table to route according to a matching traffic transmission policy and output a frame to an output port of the DAS unit.

10 Claims, 10 Drawing Sheets

Related U.S. Application Data continuation of application No. 16/145,252, filed on Sep. 28, 2018, now Pat. No. 10,819,644.

(51) Int. Cl.
*H04L 41/0803* (2022.01)
*H04L 41/0893* (2022.01)
*H04L 45/02* (2022.01)
*H04L 45/302* (2022.01)
*H04L 45/64* (2022.01)
*H04L 47/2441* (2022.01)
*H04W 88/08* (2009.01)

(52) U.S. Cl.
CPC .......... *H04L 41/0893* (2013.01); *H04L 45/02* (2013.01); *H04L 45/302* (2013.01); *H04L 45/64* (2013.01); *H04L 47/2441* (2013.01); *H04W 88/085* (2013.01)

(58) Field of Classification Search
CPC . H04L 45/64; H04L 47/2441; H04L 41/0894; H04L 41/0895; H04L 41/342; H04L 45/036; H04L 45/74; H04L 47/2425; H04L 49/3009; H04B 7/022; H04W 88/085; H04W 24/04; H04W 8/04
See application file for complete search history.

(56) References Cited

U.S. PATENT DOCUMENTS

| | | | |
|---|---|---|---|
| 2016/0007205 A1 | 1/2016 | Hasarchi et al. | |
| 2016/0028447 A1 | 1/2016 | Etkin | |
| 2016/0337937 A1 | 11/2016 | McCann et al. | |
| 2016/0373346 A1* | 12/2016 | Hirota | H04L 45/38 |
| 2017/0063682 A1* | 3/2017 | Lentczner | H04L 12/4625 |
| 2017/0171050 A1 | 6/2017 | Puzis | |
| 2017/0264556 A1 | 9/2017 | Varga et al. | |
| 2017/0288946 A1* | 10/2017 | Thomas | H04L 45/22 |
| 2018/0167318 A1 | 6/2018 | Srinivasan | |
| 2018/0167413 A1* | 6/2018 | Raleigh | H04L 63/20 |
| 2019/0058662 A1* | 2/2019 | Hong | H04L 47/2441 |

FOREIGN PATENT DOCUMENTS

| | | |
|---|---|---|
| KR | 10-2013-0052030 A1 | 5/2013 |
| KR | 10-2014-0039991 A1 | 4/2014 |
| KR | 10-2014-0122220 A1 | 10/2014 |
| KR | 10-2015-0088626 A1 | 8/2015 |
| KR | 10-2017-0096335 A1 | 8/2017 |
| WO | 2012-049960 A1 | 4/2012 |
| WO | 2014-026005 A1 | 2/2014 |
| WO | 2017-142125 A1 | 8/2017 |

OTHER PUBLICATIONS

Non-final office action mailed Jun. 4, 2019 for Japanese Application No. 2018-184047.

China Unicom, "Discussion on positioning problem for indoor distributed antenna system", 3GPP TSGORAN WG2 Meeting #75, Athens, Greece, Aug. 22-26, 2011.

Isao Taniguchi, "Scheme of Network Virtualization and SDN/OpenFlow", May 30, 2014, first edition, p. 91, 98, 101-102, 119-120, 121, 125-131, 135-136, 154.

Extended European Search Report mailed Mar. 7, 2019 for European Application No. 18197264.7.

Anonymous, "OpenFlow Switch Specification Version 1.4.0", Oct. 14, 2019, XP055551711, https://www.opennetworking.org/images/stories/downloads/sdn-resources/onf-specifications/openflow/openflow-spec-v1.4.0.pdf.

Bercovich Dudu et al., "Software-Defined Wireless Transport Networks for Flexible Mobile Backhaul in 5G Systems", Mobile Networks and Applications, ACM, New York, NY, US, vol. 20, No. 6, Aug. 21, 2015, pp. 793-801, XP035924161.

Non-final office action mailed Dec. 30, 2019 from USPTO for U.S. Appl. No. 16/145,252.

Notice of allowance mailed Jun. 22, 2020 from USPTO for U.S. Appl. No. 16/145,252.

Notice of allowance mailed Aug. 3, 2020 from USPTO for U.S. Appl. No. 16/145,252.

Notice of allowance mailed Oct. 27, 2021 from USPTO for U.S. Appl. No. 17/026,314.

* cited by examiner

FIG. 7

| HEU-A POLICY INFORMATION | | | | HU-B POLICY INFORMATION | | | RU-C POLICY INFORMATION | |
|---|---|---|---|---|---|---|---|---|
| Service mapping and Framing Table | | Forwarding Table | | Forwarding Table | | | Forwarding Table | |
| Match Rule | Action | Match Rule | Action | Match Rule | Action | | Match Rule | Action |
| Service A | Add frame header with Destination Tag X | Destination Tag X | Output port#4 | Destination Tag X and Input port #1 | Output port#3 | | Destination Tag X and Input port #1 | Output port#2 |
| Service B | Add frame header with Destination Tag X | Destination Tag Y | Output port#5 | Destination Tag Y and Input port #1 | Output port#3 | | Destination Tag Y and Input port #1 | Output port#3 |

FIG. 9

| HEU-A POLICY INFORMATION | | | | HU-B POLICY INFORMATION | | |
|---|---|---|---|---|---|---|
| Service mapping and Framing Table | | Forwarding Table | | Forwarding Table | | |
| Match Rule | Action | Match Rule | Action | Match Rule | Action | |
| Service A | Add frame header with Destination Tag X | Destination Tag X | Output port#4 | Destination Tag X and Input port #1 | Output port#3 | |
| Service B | Add frame header with Destination Tag Y | Destination Tag Y | Output port#6 | | | |

| RU-C POLICY INFORMATION | | HU-B POLICY INFORMATION | | RU-C POLICY INFORMATION | |
|---|---|---|---|---|---|
| Forwarding Table | | Forwarding Table | | Forwarding Table | |
| Match Rule | Action | Match Rule | Action | Match Rule | Action |
| Destination Tag X and Input port #1 | Output port#2 | Destination Tag Y and Input port #1 | Output port#3 | Destination Tag Y and Input port #1 | Output port#3 |

OPENFLOW BASED DISTRIBUTED ANTENNA SYSTEM POLICY ROUTING METHOD

CROSS-REFERENCE TO RELATED APPLICATION

This application is a divisional application of U.S. application Ser. No. 17/026,314, filed Sep. 21, 2020, which is a continuation application of U.S. application Ser. No. 16/145,252, filed Sep. 29, 2018 (now U.S. Pat. No. 10,819,644), which claims priority to and the benefit of Korean Patent Application No. 10-2017-0127921, filed on Sep. 29, 2017, the disclosures of which are incorporated herein by reference in their entirety.

BACKGROUND

1. Field of the Invention

The present invention relates to a wireless communication technique, and more particularly, to a technique for a distributed antenna system.

2. Discussion of Related Art

A distributed antenna system is a system in which a plurality of antennas are distributed in a cell coverage of a macro wireless base station of a mobile communication provider and which amplifies and relays a signal so that a signal of a base station can reach a shadow region where it is difficult for radio waves to reach. Recently, the distributed antenna system supports a function of a backhaul transmission network that can support Long-Term Evolution/3rd Generation (LTE/3G) Smallcells and WiFi access points (APs), as one of additional functions.

In distributed antenna systems, which are generally used, a transmission policy for transmitting wireless signals is statically configured. Recently, some vendors have developed and shown distributed antenna systems to which a function is added for dynamically rearranging resources on the basis of their own specifications.

Software-defined networking technology is next-generation networking technology that can facilitate network routing and control complicated operational management by software programming. To this end, in the software-defined networking technology, a network is divided into a data plane and a control plane, a standardized interface is provided between the data plane and the control plane, and a network operator can program the control plane according to various situations to control a communication function, which is performed in the data plane, in various ways.

An OpenFlow protocol is a protocol mainly used in the software-defined network that performs various classification, forwarding, band control, and statistical processing of packets according to user's policy.

SUMMARY OF THE INVENTION

The present invention is directed to providing a technique for improving efficiency of traffic transmission by dynamically controlling a traffic transmission policy of a distributed antenna system using an OpenFlow protocol.

The present invention is directed to providing a technique for enhancing compatibility with other vendor products using a standard protocol.

The present invention is directed to providing a technique for expanding functions of a distributed antenna system using various functions provided by an OpenFlow protocol.

The present invention is directed to providing a technique for realizing scalability and ease of operation and maintenance by supporting a flexibly and easily reconfigurable network as an antenna system evolves into a distributed antenna system supporting a software-defined network (SDN).

According to an aspect of the present invention, there is provided a distributed antenna system (DAS) which includes a DAS unit and a DAS controller. The DAS unit may be any one of a headend unit, a hub unit, and a radio unit and may route received traffic on the basis of a set traffic transmission policy. The DAS controller may receive a policy setting request from an operator or an SDN based application, generate or change a traffic transmission policy, and transmit a corresponding traffic transmission policy to the DAS unit.

The DAS controller may periodically check a status of the DAS unit and dynamically change the traffic transmission policy when changing the status and transmit the changed policy to the DAS unit.

The DAS controller may receive an event for a port status change from the DAS unit, dynamically change the traffic transmission policy, and transmit the changed policy to the DAS unit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 7 is a table showing an example of policy information, which is set for the traffic transmission, with respect to a distributed antenna system unit shown in FIG. 6;

FIG. 9 is a table showing an example of policy information, which is set for the policy change and the traffic transmission, with respect to a distributed antenna system unit shown in FIGS. 8A and 8B.

DETAILED DESCRIPTION OF EXEMPLARY EMBODIMENTS

The above-described and additional aspects are embodied through embodiments described with reference to the accompanying drawings. It will be understood that components of each of the embodiments may be combined in various ways within one embodiment unless otherwise stated or contradicted by one another. Each of blocks in a block diagram may be a representation of a physical part in some cases, but may be a logical representation of a portion of a function of one physical part or a function of a plurality of physical parts in other cases. In some cases, the block or an entry of a portion of the block may be a set of program instructions. All or some of the blocks may be implemented as hardware, software, or a combination thereof.

Figure 1:
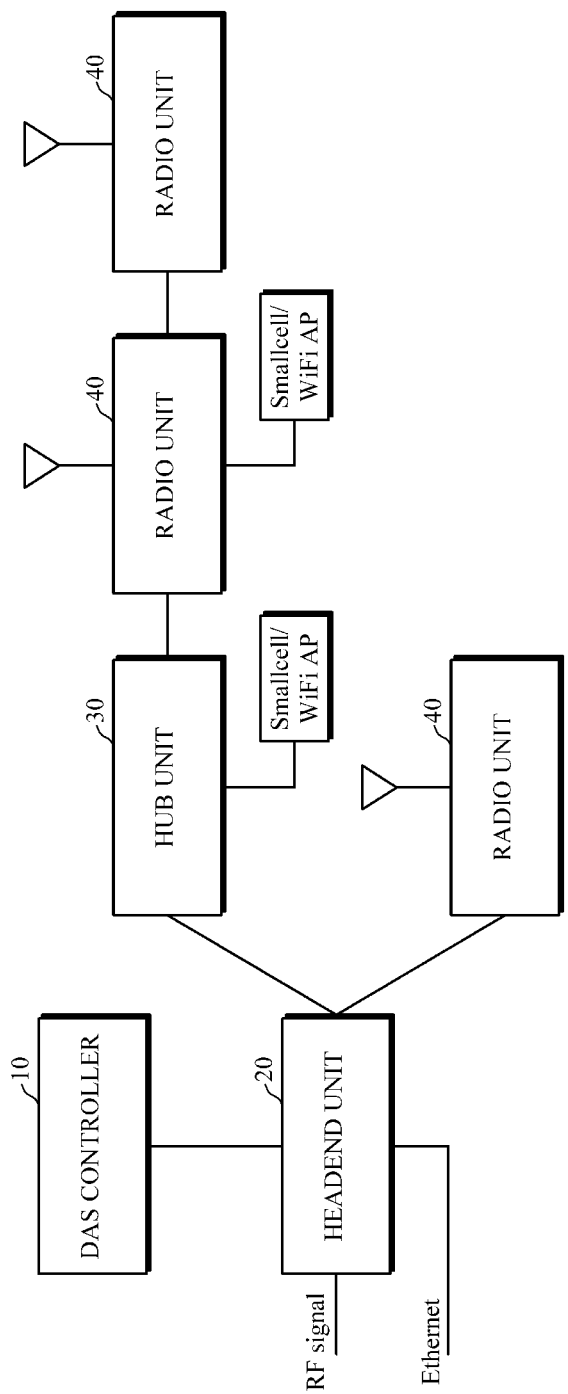
FIG. 1 is a block diagram showing a configuration of a distributed antenna system which supports an OpenFlow protocol according to an embodiment.

FIG. 1 is a block diagram showing a configuration of a distributed antenna system (DAS) which supports an Open-Flow protocol according to an embodiment.

The DAS is a system in which a plurality of distributed antennas, which are connected to a single base station through wires or dedicated lines, are used. The single base station manages a plurality of antennas positioned to be spaced by a predetermined distance or more inside a cell served by the base station. The DAS is distinguished from a centralized antenna system in which a plurality of base station antennas are concentrated in a cell in that a plurality of antennas are distributed by a predetermined distance or more in a cell.

Further, the DAS is distinguished from a femtocell in that units of each of the distributed antennas do not control a corresponding antenna region itself, but a central base station of a cell controls all distributed antenna regions positioned in the cell. Further, the DAS is distinguished from a multi-hop relay system or an ad-hoc network, in which a base station and a relay station are wirelessly connected, in that the units of the distributed antennas are connected to each other through wires or dedicated lines. In addition, the DAS is also distinguished from a repeater which simply amplifies and transmits a signal in that each of the distributed antennas can transmit a different signal to each terminal adjacent to the antenna in response to a command transmitted from a base station.

The DAS according to an aspect of the present invention shown in FIG. 1 includes a DAS unit and a DAS controller 10.

The DAS unit is any one of a headend unit (HEU) 20, a hub unit (HU) 30, and a radio unit (RU) 40 and transmits traffic, which is received through an input port of the unit on the basis of a preset traffic transmission policy, to an output port thereof.

The HEU 20 of the DAS is interfaced with a base station and functions to receive, digitize, perform framing, and transmit various wireless signals. Further, the HEU 20 may receive, perform framing, and transmit Ethernet data in order to support a backhaul function for a Smallcell service or a WiFi service.

When the HEU 20 performs framing, the HEU 20 adds header information for data transmission, performs routing according to a rule found by comparing with a match field of a traffic transmission policy in a data plane 300 on the basis of the added header information, and transmits a corresponding frame to a destination port. Uplink traffic processing is performed in reverse order.

The HEU 20 converts an analog radio frequency (RF) signal in a RF band received from the base station into a digital RF signal and then distributes the converted digital signal to a plurality of output ports. In the embodiment shown in FIG. 1, an example of the HEU 20 is shown as having two output ports.

The HU 30, or the RU 40, may be connected to the output ports.

The HU 30 receives a frame and then transmits the frame to the destination port on the basis of header information of the frame. According to another aspect of the present invention, when the destination port is an Ethernet port for supporting a Smallcell service or a WiFi service, the HU 30 extracts Ethernet information from the frame and then performs switching. Uplink traffic processing is performed in reverse order.

After the RU 40 receives a frame, the RU 40 converts the frame into an RF signal and transmits the frame on the basis of the header information of the frame, or transmits the frame to the destination port (in the case of daisy chain). When the destination port is an Ethernet port for supporting a Smallcell service or a WiFi service, the RU 40 extracts Ethernet information from the frame and then transmits the Ethernet information to a corresponding Smallcell or WiFi access point (AP). Uplink traffic processing is performed in reverse order.

The DAS controller 10 is an OpenFlow controller, generates or changes a traffic transmission policy, and transmits a corresponding policy to the DAS unit using an OpenFlow protocol so that the DAS unit (the HEU, the HU, or the RU) may apply the policy to a forwarding table of the data plane 300.

The DAS controller 10 manages and controls the traffic transmission policy of the DAS units using an OpenFlow protocol, manages a status of the unit and a status of a port of the unit, and manages port-based statistics information. Particularly, the DAS controller 10 may provide a function of controlling the traffic transmission policy in various manners on the basis of the status information and the statistics information or by setting of an operator.

The DAS controller 10 may operate by being integrated with a management system of the DAS or may operate in a separate system.

As shown in FIG. 1, the WiFi AP and the Smallcell may be dynamically configured to be connected to the HU 30 and the RU 40 for a backhaul service according to installation environment and requirements of the user.

As the number of installed WiFi APs and Smallcells increases and the number of users increases, congestion of the backhaul service provided by the DAS is inevitable, and thus quality of service (QoS) processing may be provided using a metering function provided in the OpenFlow protocol so that service efficiency may be improved.

Figure 2:
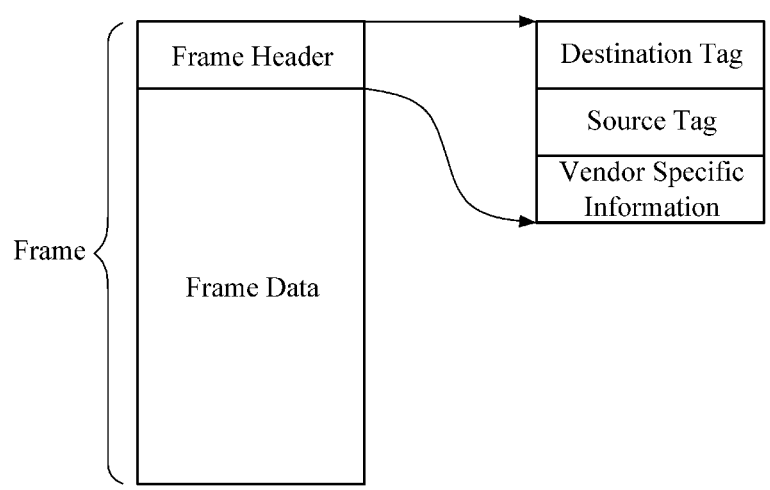
FIG. 2 is a diagram showing a structure of a frame used in the distributed antenna system shown in FIG. 1.

FIG. 2 is a diagram showing a structure of the frame used in the DAS shown in FIG. 1.

Referring to FIG. 2, each of the DAS units (the HEU, the HU, and the RU) of the DAS performs framing and transmits the received data for a fronthaul service and a backhaul service. In this case, one frame includes a frame header and frame data.

The frame header may be a portion including information on features of the corresponding frame and including a destination tag, a source tag, and vendor specific information.

Here, the destination tag is a tag which designates a final destination of the corresponding frame and is identifiable on a network. When the destination tag is mapped for Ethernet, the destination tag serves as a destination Ethernet address.

Further, the source tag is a tag which designates a source of the corresponding frame and is identifiable on a network. When the source tag is mapped for Ethernet, the source tag serves as a source Ethernet address. The source tag is a tag which represents a transmitter and is not a necessary element, and thus may be omitted in some cases.

Further, the vendor specific information is used for specific functions provided by the corresponding vendor and includes information which may be additionally set by a system manager.

A general function of the DAS, which use a destination tag value similar to a destination Ethernet address as a transmission address of a frame to transmit the corresponding frame to various destinations, is the same as a function supported in an OpenFlow protocol, in which a frame is classified using some of various fields included in a header as match fields and then various actions (e.g., transmission of a frame to a specific output port and the like) are performed. Therefore, each unit of the DAS, in which an OpenFlow protocol, which is a protocol used as a construction technique in a software-defined network (SDN), is used as a protocol of a control plane 200 of each unit of the DAS and processes actual data, may be used without changing the control plane 200 even when frame routing of the vendor's own specification for using the frame as shown in FIG. 2 is supportable and a general-purpose header of standard specification, such as an Ethernet header, is used as the frame header.

Figure 3:
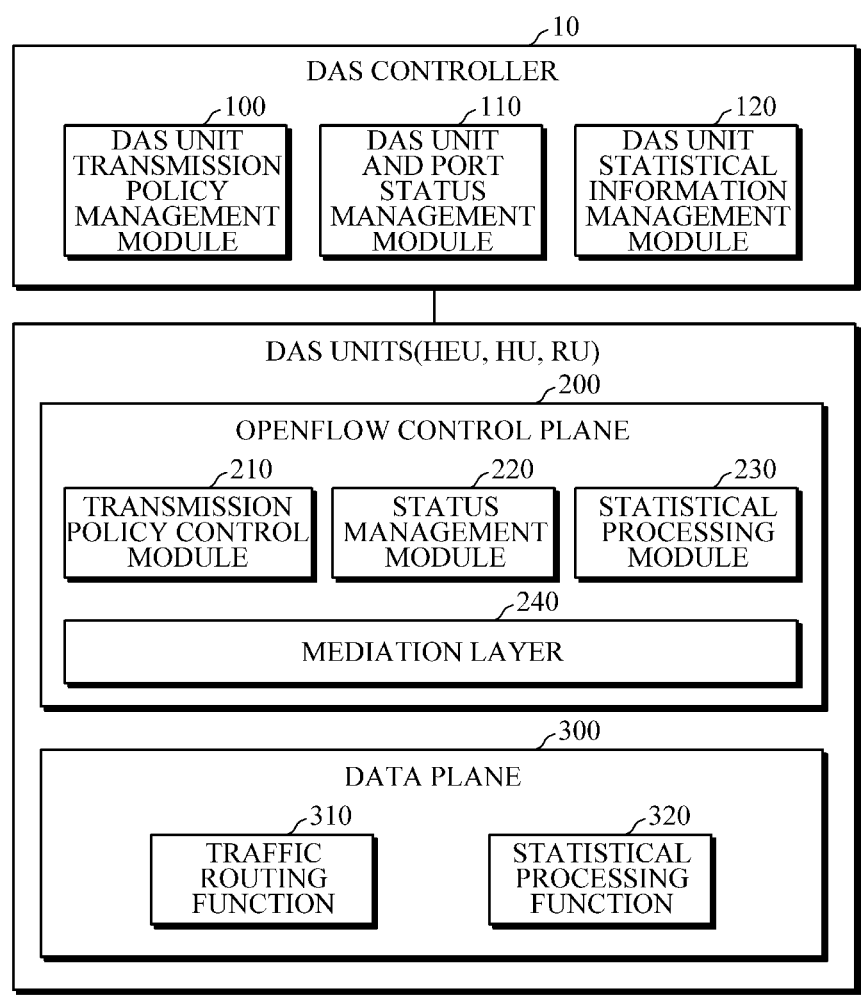
FIG. 3 is a block diagram showing a configuration of distributed antenna system units according to an embodiment.

FIG. 3 is a block diagram showing a configuration of DAS units according to an embodiment. FIG. 3 shows a module structure of each of the units of the DAS using a traffic transmission function which uses the OpenFlow protocol shown in FIG. 1.

A DAS controller 10 may be an OpenFlow controller and include a DAS unit transmission policy management module 100, a DAS unit and port status management module 110, and a DAS unit statistics information management module 120. The DAS controller 10 may perform a function of managing a traffic transmission policy for the DAS units (the HEU, the HU, and the RU) using an OpenFlow protocol, a function of managing a status of the unit and a status of a port of the unit, and a function of managing statistics information on the DAS units.

When the traffic transmission policy is required to be changed by an operation of an operator or by using an application of an external northbound network management system present for integrated management of an SDN, the DAS unit transmission policy management module 100 requests for a change of the traffic transmission policy from each of the DAS units using the OpenFlow protocol. Further, the DAS unit transmission policy management module 100 may dynamically change the traffic transmission policy according to a status event which is transmitted from each of the DAS units through the DAS unit and port status management module 110 and may dynamically generate or change a traffic transmission policy on the basis of the statistics information from each of the DAS units collected in the DAS unit statistics information management module 120.

The DAS unit and port status management module 110 may receive a corresponding change event from the DAS unit and manage the port status of the DAS unit when the port status of the DAS unit is changed using a control message provided in the OpenFlow protocol. Further, the DAS unit and port status management module 110 may periodically exchange status management messages with the DAS unit and check and manage a status of the DAS unit itself. As described above, the DAS unit transmission policy management module 100 may dynamically change the traffic transmission policy according to the status of the unit and the status of the port which are managed by the DAS unit and port status management module 110.

The DAS unit statistics information management module 120 may periodically monitor a current resource usage status of each of the DAS units using various port and unit statistics functions provided in the OpenFlow protocol. As described above, the DAS unit transmission policy management module 100 may dynamically generate or change a traffic transmission policy on the basis of the statistics information from each of the DAS units collected in the DAS unit statistics information management module 120.

The DAS unit is any one of an HEU 20, an HU 30, and an RU 40. Each DAS unit is divided into a control plane 200 and a data plane 300. The control plane 200 may be configured to build and store control information which is required to process and transmit a signal transmitted into the DAS unit. The data plane 300 may receive, perform framing, and route the signal transmitted into the DAS unit.

The control plane 200 of the DAS unit may interwork with the DAS controller 10, which is an OpenFlow controller, using an OpenFlow protocol and may include a transmission policy control module 210, a status management module 220, a statistical processing module 230, and a mediation layer 240 as submodules.

The transmission policy control module 210 may receive an addition, deletion, or change event for traffic transmission policy information from the DAS controller 10 and change information of the data plane 300.

That is, the DAS unit receives the traffic transmission policy from the DAS controller 10 and updates a forwarding table of the data plane 300, in which the traffic transmission policy information is stored.

Further, the DAS unit may receive a service classification policy and a framing policy, which are generated or changed by the DAS controller 10, and update a mapping table of the service data plane 300 in which service mapping information and framing information are stored.

In this case, the updated traffic transmission policy may be a policy applied to radio traffic for supporting a front haul function for a macro wireless base station or a policy applied to Ethernet traffic for supporting a back haul function for Smallcells and WiFi.

The policy applied to the Ethernet traffic may be more variously configured than the policy applied to the radio traffic. This is because an Ethernet header has more various pieces of information. Conditions which are applicable to the OpenFlow protocol may be variously applied from a physical port number to a Transmission Control Protocol/User Datagram Protocol (TCP/UDP) port number of the Open Systems Interconnection (OSI) layer 4. Such conditions may be used to determine a frame transmission method for Ethernet traffic.

The status management module 220 performs a function of periodically exchanging the status information with the DAS controller 10 to manage statuses of each other, and a function of transmitting a corresponding event to the DAS controller 10 when the port status in the unit is changed.

That is, the DAS controller 10 may receive the status information of the unit from the status management module 220 of the DAS unit at a set cycle, change the traffic transmission policy by dynamically reflecting the status information when the status information of the unit is changed, and transmit the changed policy back to the DAS unit using the OpenFlow protocol. In this case, an optimum time may be set to the cycle of exchanging the status information of the unit by the operator according to a network operation policy and network characteristics.

Further, the status management module 220 of the DAS unit may transmit port status change information in the unit to the DAS controller 10. The DAS controller 10 may dynamically change the traffic transmission policy by reflecting the received port status change information of the unit and transmit the changed policy back to the DAS unit.

The statistical processing module 230 may periodically collect traffic statistics, which are processed in the data plane 300, for each port and report the traffic statistics to the DAS controller 10. The DAS controller 10 may dynamically generate or change a traffic transmission policy on the basis of the statistics for each unit and the statistics information for each port.

Further, the operator may request for a change of the traffic transmission policy from the DAS controller 10 on the basis of the collected statistics information and request for a change of the traffic transmission policy from the DAS controller 10 using an application of an external northbound network management system present for integrated management of an SDN.

The mediation layer 240 allows the data plane 300 of the DAS unit to interwork with the DAS controller 10 even when the data plane 300 of the DAS unit does not support the OpenFlow protocol and supports only functions of the vendor's own specification. The mediation layer 240 may map the vendor's policy on the basis of information of the OpenFlow protocol in order to interwork with the DAS controller 10. For example, the mediation layer 240 may allow the data plane 300 of the DAS unit to use the vendor's own specification and the upper control plane 200 to use the OpenFlow specification.

That is, when the data plane 300 of the DAS unit provides only the traffic transmission the function of the vendor's own specification, the mediation layer 240 may map and set the OpenFlow based traffic transmission policy to the traffic transmission policy of the vendor's own specification of the DAS unit.

The data plane 300 of the DAS unit may process data and may include a traffic routing function 310 and a statistical processing function 320 as submodules.

The traffic routing function 310 provides a function of transmitting traffic, which is received through an input port to an output port, on the basis of the information set by the control plane 200. The traffic routing function 310 supports an N-to-M routing function in order to support various types of traffic transmission.

The traffic routing is performed according to a forwarding table set in the data plane 300, and the forwarding table is updated by the transmission policy control module 210 of the control plane 200 using the OpenFlow protocol in response to a request of the DAS controller 10.

The forwarding table may include a flow table, a group table, and a meter table.

The flow table is a table, which includes information such as condition (a match field) information, processing (action) information, and statistical (counter) information and stores information for performing set processing when specific traffic matches a condition of a specific entry of the flow table.

The group table is a table configured so that a series of processing for specific traffic is executed. When the processing information of the flow table is a group identifier (ID), which is entry information of the group table, a process of action buckets stored in a corresponding group table is sequentially executed. The group table consists of a group ID, a group type, statistics, and action buckets, and the group type is used to determine whether a process of all action buckets is performed or a process of only some of the action buckets is performed.

The meter table is provided so that a simple quality of service (QoS) may be realized in an OpenFlow protocol in various ways. For example, a method of measuring a traffic bandwidth of a specific port and adjusting the bandwidth may be used.

The statistical processing function 320 provides a function of recording various types of statistics information on the traffic received through the input port and the traffic transmitted to the output port. Further, the statistical processing function 320 provides a function of transmitting the corresponding information so as to be used by the statistical processing module 230 of the control plane 200.

Figure 4:
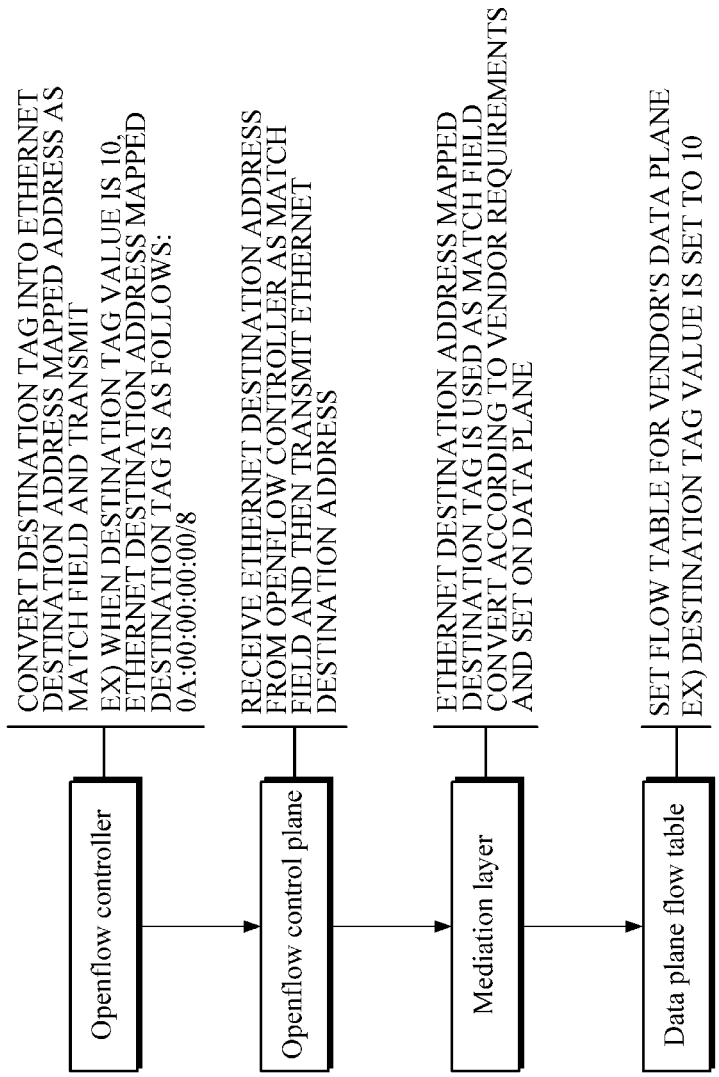
FIG. 4 is a diagram showing a process of setting a data plane of a distributed antenna system unit which does not support an OpenFlow protocol according to another embodiment.

FIG. 4 is a diagram showing a process of setting a data plane 300 of a DAS unit which does not support an OpenFlow protocol according to another embodiment.

Referring to FIG. 4, for example, when an OpenFlow controller is instructed to change a traffic transmission policy, as in "A match field is a destination tag 10 and the processing converts the destination tag 10 into a destination Ethernet address to transmit a frame," by an operation of an operator or using an application of an external northbound network management system present for integrated management of an SDN, the OpenFlow controller transmits a corresponding policy to the DAS unit.

A control plane 200 of the DAS unit processes the traffic transmission policy received from the OpenFlow controller and transmits the processed policy to a mediation layer 240.

The mediation layer 240 operates differently according to whether the data plane 300 supports the OpenFlow protocol or only the vendor's own specification. When the data plane 300 supports only the vendor's own specification as shown in FIG. 4, the data plane 300 does not support routing through a destination Ethernet address, and thus the destination tag is maintained in accordance with the vendor's own specification, and the frame is changed to be routed to the destination and is transmitted to the data plane 300.

The data plane 300 updates a flow table by reflecting the received traffic transmission policy to the flow table. For example, in the OpenFlow protocol, it is requested to change the destination tag to the destination Ethernet address. However, since the data plane 300 does not support the OpenFlow protocol, unlike the request, it is changed to maintain the destination tag in accordance with the vendor's own specification, and the flow table is updated.

Figure 5:
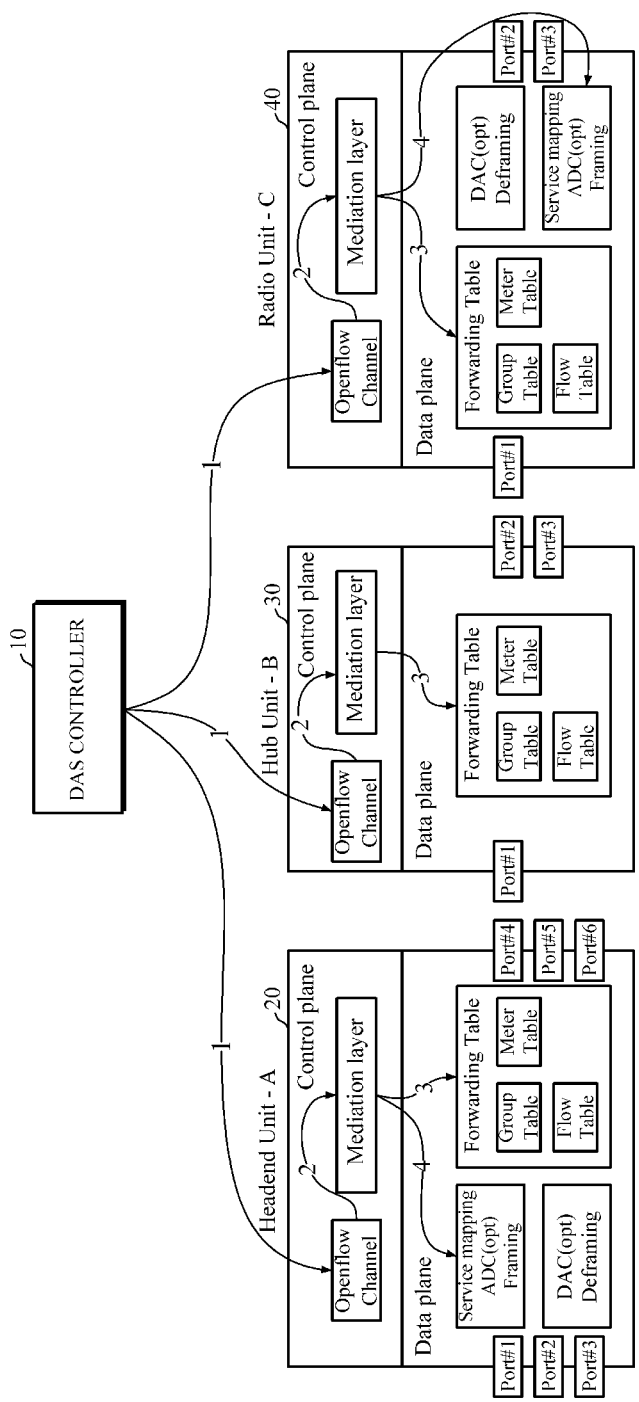
FIG. 5 is a diagram showing a process of setting a policy of a distributed antenna system using an OpenFlow protocol according to still another embodiment.

FIG. 5 is a diagram showing a process of setting a policy of a DAS using an OpenFlow protocol according to still another embodiment.

According to an aspect of the present invention, an OpenFlow based DAS policy setting method includes receiving, by a DAS controller 10, a new policy setting request from an operator terminal or an integrated SDN supporting application, processing, by the DAS controller 10, the request to new policy information and transmitting the processed information to a DAS unit using an OpenFlow protocol, receiving, by the DAS unit, the new policy information, mapping, by the DAS unit, the received policy information to setting information suitable for a structure of a data plane 300 of the DAS unit, and updating, by the DAS unit, a forwarding table with the mapped setting information.

According to another aspect of the present invention, in the OpenFlow based DAS policy setting method, the policy information may include radio traffic transmission policy information or an Ethernet traffic transmission policy.

According to still another aspect of the present invention, the OpenFlow based DAS policy setting method may further include updating, by the DAS unit, a service classification policy and a framing policy with the mapped setting information.

Referring to FIG. 5, first, when the DAS controller 10, that is, an OpenFlow controller, receives a new policy information setting request through a command line interface (CLI) of an operator or via a Web interface, or receives the new policy information setting request from an application of an external northbound network management system present for integrated management of an SDN, the OpenFlow controller processes corresponding policy information to transmit the processed policy information to the DAS unit. In the example shown in FIG. 5, the OpenFlow controller transmits the corresponding policy information to an HEU A, an HU B, and an RU C.

Second, an OpenFlow channel of the control plane 200 of the DAS unit receives the policy information from the OpenFlow controller using the OpenFlow protocol and transmits the received policy information to a mediation layer 240.

Third, the mediation layer 240 of the control plane 200 of the DAS unit performs a process of mapping the policy information of the OpenFlow protocol in accordance with the structure of the data plane 300 thereunder. In this case, when the data plane 300 supports the OpenFlow protocol, the forwarding table is updated with the received policy information itself, and when the data plane 300 does not support the OpenFlow protocol and supports only the vendor's own specification, the policy information is mapped in accordance with the vendor's own specification, and the forwarding table is updated. The updated information in the corresponding forwarding table becomes information for performing traffic routing.

Fourth, when the DAS unit is a unit which performs framing or deframing on the received traffic, such as the HEU 20 or the RU 40, the service mapping and framing table of the data plane 300 is updated with the policy information for service classification and framing.

A service provided by the DAS may be classified into a macro fronthaul service and a Smallcell or WiFi backhaul service.

The macro fronthaul service refers to a service, in which one or more macro wireless base station signals (code division multiple access (CDMA), Global System for Mobile Communications (GSM), wide code division multiple access (WCDMA), Long-Term Evolution (LTE), LTE-A, and the like) are mainly integrated and which transmits the macro wireless base station signals to a remotely positioned RU 40 or provides transmission in a reverse direction. That is, the HEU 20 receives RF signals and common public radio interface (CPRI) frames of various providers and transmits the RF signals and the CPRI frames to a plurality of RUs 40. In this case, the RF signals or CPRI frames are transmitted via a transmission network being used in the DAS, and the RUs 40 restore the RF signals to the original signals, convert the CRPR frames into RF signals, and wirelessly transmits the RF signals.

The Smallcell or WiFi backhaul service refers to a service in which a transmission network being used in the DAS is used for supporting a Smallcell or WiFi backhaul service which transmits an Ethernet packet to a WiFi AP or a Smallcell which is connected to the HU 30 or the RU 40 or provides transmission in a reverse direction.

The framing is to generate a frame composed of frame data including the received traffic data and a frame header including a destination tag, a source tag, and vendor specific information, and the deframing is to delete a frame header from a destination of the destination tag and extract the frame data.

According to an additional aspect of the present invention, the DAS controller 10 may dynamically change the traffic transmission policy according to a status of the DAS unit and a status of a port of the DAS unit and transmit the changed policy to the DAS unit.

That is, the OpenFlow based DAS policy setting method may further include receiving, by the DAS controller 10, the status information of the DAS unit at a set cycle, and reflecting, by the DAS controller 10, the received status information to change the traffic transmission policy and transmit the changed policy to the DAS unit.

Further, the OpenFlow based DAS policy setting method may further include transmitting, by the DAS unit, the changed port status information to the DAS controller 10, and reflecting, by the DAS controller 10, the received port status of the DAS unit to change the traffic transmission policy and transmit the changed policy to the DAS unit.

Figure 6:
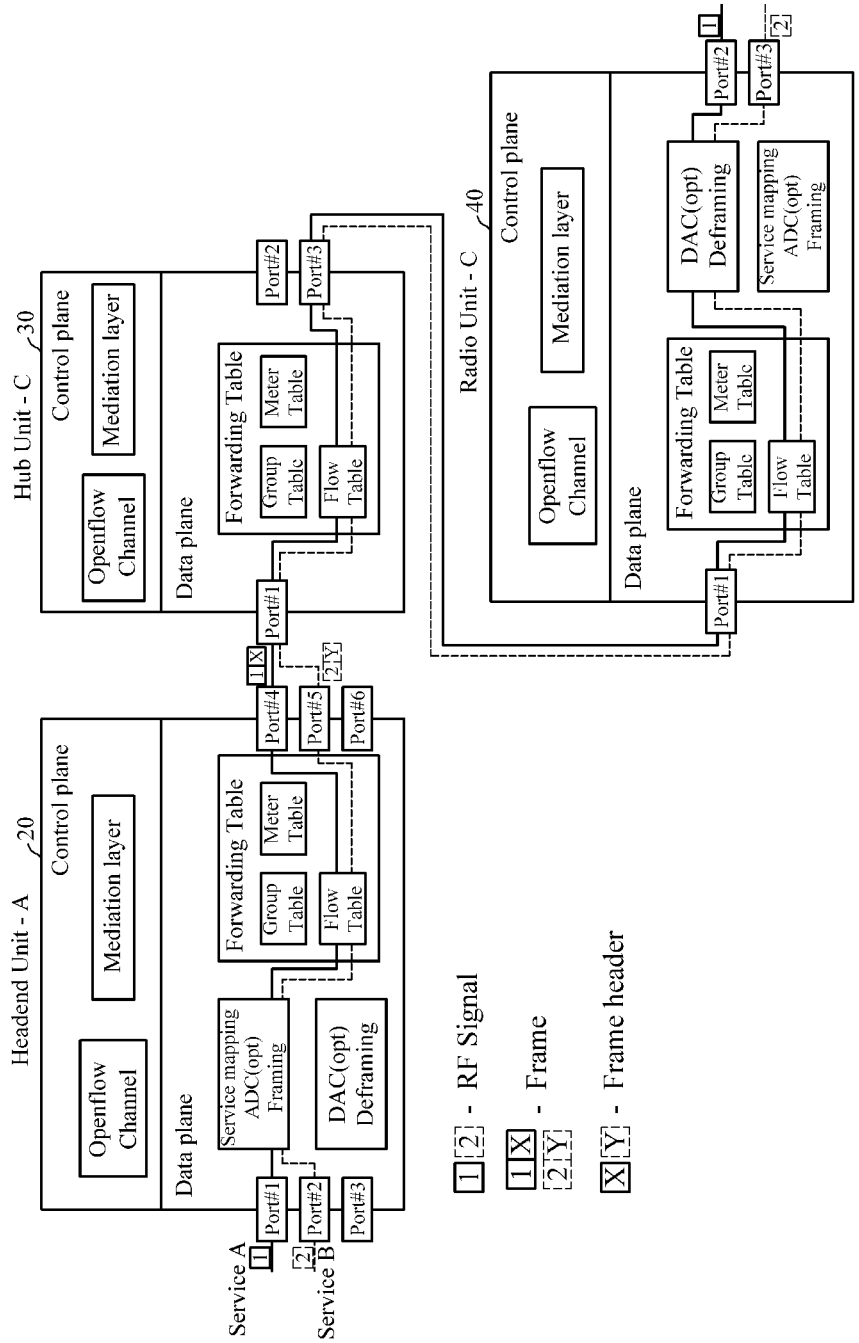
FIG. 6 is a diagram showing an example of traffic transmission of a distributed antenna system according to yet another embodiment.

FIG. 6 is a diagram showing an example of traffic transmission of a DAS according to yet another embodiment, and FIG. 7 is a table showing an example of policy information, which is set for the traffic transmission, with respect to the DAS unit shown in FIG. 6.

According to an aspect of the present invention, a traffic routing method of an OpenFlow based DAS includes extracting, by the DAS unit, a match field from the header information of the received frame, and comparing, by the DAS unit, the extracted match field with a matching rule of the forwarding table to route according to the matching traffic transmission policy and output the frame to an output port.

According to another aspect of the present invention, the traffic transmission policy of the OpenFlow based DAS may include a method of routing on the basis of a traffic routing policy which supports a policy applied to radio traffic or Ethernet traffic.

According to still another aspect of the present invention, the traffic routing method of the OpenFlow based DAS may further include, before the extracting of the match field performed by the DAS unit, classifying a service of traffic received through an input port and performing framing according to the classified service.

According to yet another aspect of the present invention, the traffic routing method of the OpenFlow based DAS may further include performing deframing, before the outputting of the frame to the output port performed by the DAS unit.

It is assumed that the policy information of the DAS unit is set as the table shown in FIG. 7 through the process shown in FIG. 5.

An example of traffic transmission in a downlink direction of the DAS will be described with reference to FIGS. 6 and 7.

First, an example of setting policy information of each unit will be described with reference to FIG. 7. An HEU A is a unit which performs framing. Policy information of the HEU A is stored in a service mapping and framing table and a forwarding table. Both of the service mapping and framing table and the forwarding table include matching rules and actions. In the example of FIG. 7, the service mapping and framing table and the forwarding table are composed of two entries.

In the service mapping and framing table of the HEU A of FIG. 7, when a service of the received traffic is classified and matches "Service A," a frame header with a destination tag which is set to "X" is added, and when the service matches "Service B," a frame header with a destination tag which is set to "Y" is added.

In the forwarding table of the HEU A of FIG. 7, when the destination tag of the frame header of the received frame matches "X," a corresponding frame is transmitted to an output port #4, and when the destination tag matches "Y," a corresponding frame is transmitted to an output port #5.

An HU B is a unit which does not perform framing. Policy information of the HU B is stored in a forwarding table. The forwarding table of the HU B also includes matching rules and actions. In the example of FIG. 7, the forwarding table is composed of two entries.

In the forwarding table of the HU B of FIG. 7, when an input port number of the received frame is "1" and a destination tag of the frame header matches "X," a corresponding frame is transmitted to an output port #3, and when the input port number of the received frame is "1" and the destination tag matches "Y," a corresponding frame is transmitted to the output port #3.

An RU C is a unit which performs framing and performs deframing in a downlink, and thus only policy information stored in a forwarding table is shown in the drawing. The forwarding table of the RU C also includes matching rules and actions. In the example of FIG. 7, the forwarding table is composed of two entries.

In the forwarding table of the RU C of FIG. 7, when an input port number of the received frame is "1" and a destination tag of the frame header matches "X," a corresponding frame is transmitted to an output port #2, and when the input port of the received frame is "1" and the destination tag matches "Y," a corresponding frame is transmitted to an output port #3.

Referring to FIG. 6 based on the configuration of the table shown in FIG. 7, first, the HEU A receives an RF signal corresponding to "Service A" from a macro base station. In FIG. 6, the received RF signal is indicated by a box #1.

Service mapping and framing are performed in a data plane 300 of the HEU A. Therefore, a service mapped to a service of the received RF signal is searched for in the matching rules in the service mapping and framing table. As shown in the table of FIG. 7, since the service matches "Service A" of a first entry, the received RF signal is used as frame data and the destination tag of the frame header is set as "X" to perform framing. In this case, the source tag and the vendor specific information are also included in the frame header, and a description of the routing process will be omitted.

The data plane 300 of the HEU A performs framing on the received RF signal and then searches for a matching rule in the forwarding table using a value of the destination tag of the frame header. According to FIGS. 6 and 7, since the destination tag of the frame is composed as "X," the value of the destination tag of the frame matches the first entry of the forwarding table. Therefore, the data plane 300 transmits the corresponding frame to an output port #4, which is the value stored in the action.

A data plane 300 of the HU B searches for a matching rule in the forwarding table using the input port number of the received frame and the value of the destination tag of the frame header as keywords. According to FIGS. 6 and 7, since the input port number of the received frame is "1" and the destination tag of the frame is "X," the value of the destination tag of the frame matches the first entry of the forwarding table. Therefore, the data plane 300 transmits the corresponding frame to the output port #3, which is the value stored in the action.

A data plane 300 of the RU C searches for a matching rule in the forwarding table using the input port number of the received frame and the value of the destination tag of the frame header as keywords. According to FIGS. 6 and 7, since the input port number of the received frame is "1" and the destination tag of the frame is "X," the value of the destination tag of the frame matches the first entry of the forwarding table. Therefore, the data plane 300 transmits a corresponding frame to the output port #2, which is the value stored in the action.

Further, an RF signal of a box #2, which is another example of the downlink, will also be described. The HEU A receives an RF signal corresponding to "Service B" from the macro base station through a port #2. In FIG. 6, the received RF signal is indicated by the box #2.

Service mapping and framing are performed in the data plane 300 of the HEU A. Therefore, a service mapped to a service of the received RF signal is searched for in the matching rules in the service mapping and framing table. As shown in table of FIG. 7, since the service matches "Service B" of a second entry, the received RF signal is used as frame data and the destination tag of the frame header is set as "Y" to perform framing.

The data plane 300 of the HEU A performs framing on the received RF signal and then searches for a matching rule in the forwarding table using a value of the destination tag of the frame header. According to FIGS. 6 and 7, since the destination tag of the frame is composed of "Y," the value of the destination tag of the frame matches the second entry of the forwarding table. Therefore, the data plane 300 transmits a corresponding frame to an output port #5, which is the value stored in the action.

The data plane 300 of the HU B searches for a matching rule in the forwarding table using the input port number of the received frame and the value of the destination tag of the frame header as keywords. According to FIGS. 6 and 7, since the input port number of the received frame is "1" and the destination tag of the frame is "Y," the value of the destination tag of the frame matches the second entry of the forwarding table. Therefore, the data plane 300 transmits the corresponding frame to the output port #3, which is the value stored in the action.

The data plane 300 of the RU C searches for a matching rule in the forwarding table using the input port number of the received frame and the value of the destination tag of the frame header as keywords. According to FIGS. 6 and 7, since the input port number of the received frame is "1" and the destination tag of the frame is "Y," the value of the destination tag of the frame matches the second entry of the forwarding table. Therefore, the data plane 300 transmits a corresponding frame to an output port #3, which is the value stored in the action.

Figure 8A:
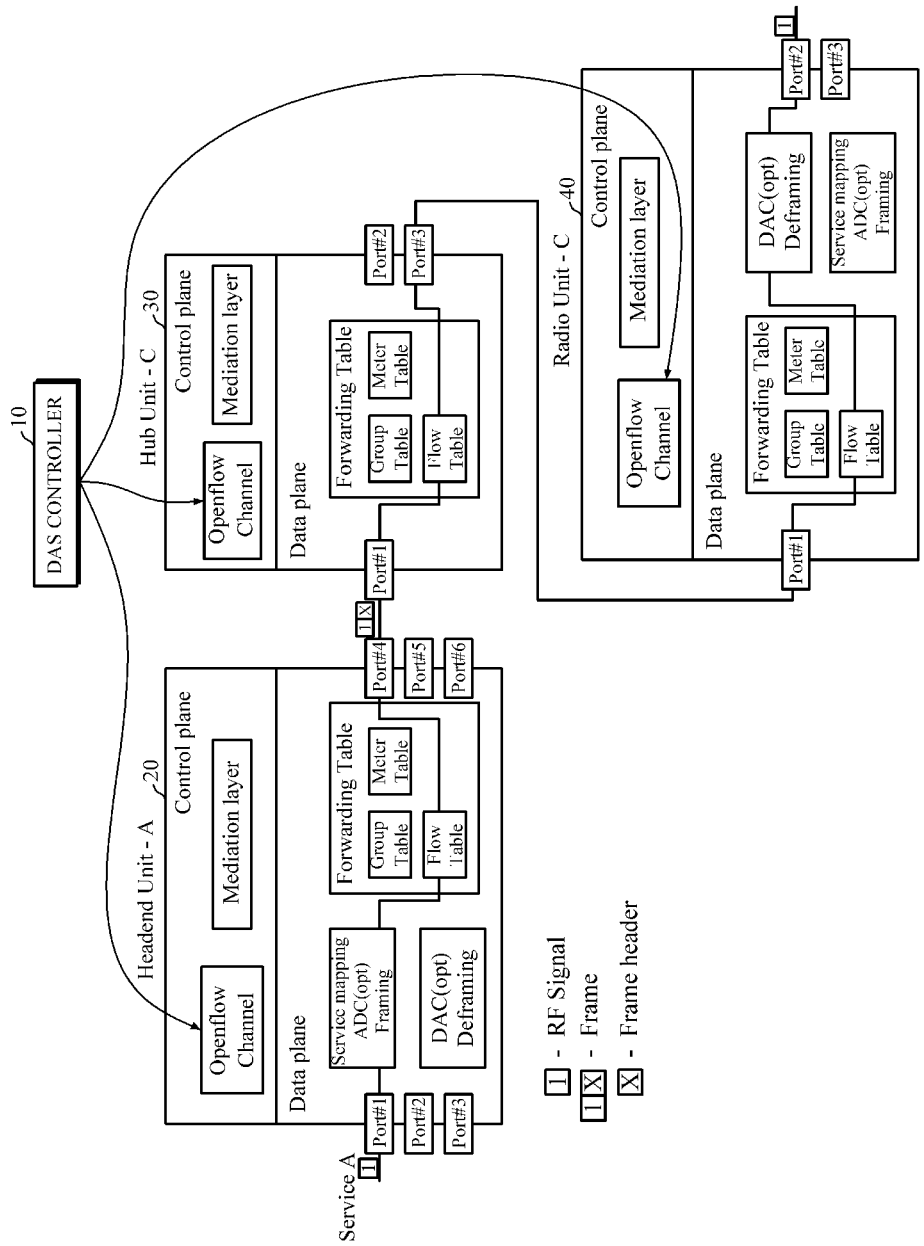
FIG. 8A is a diagram showing an example of policy change and corresponding traffic transmission of a distributed antenna system according to yet another embodiment.
Figure 8B:
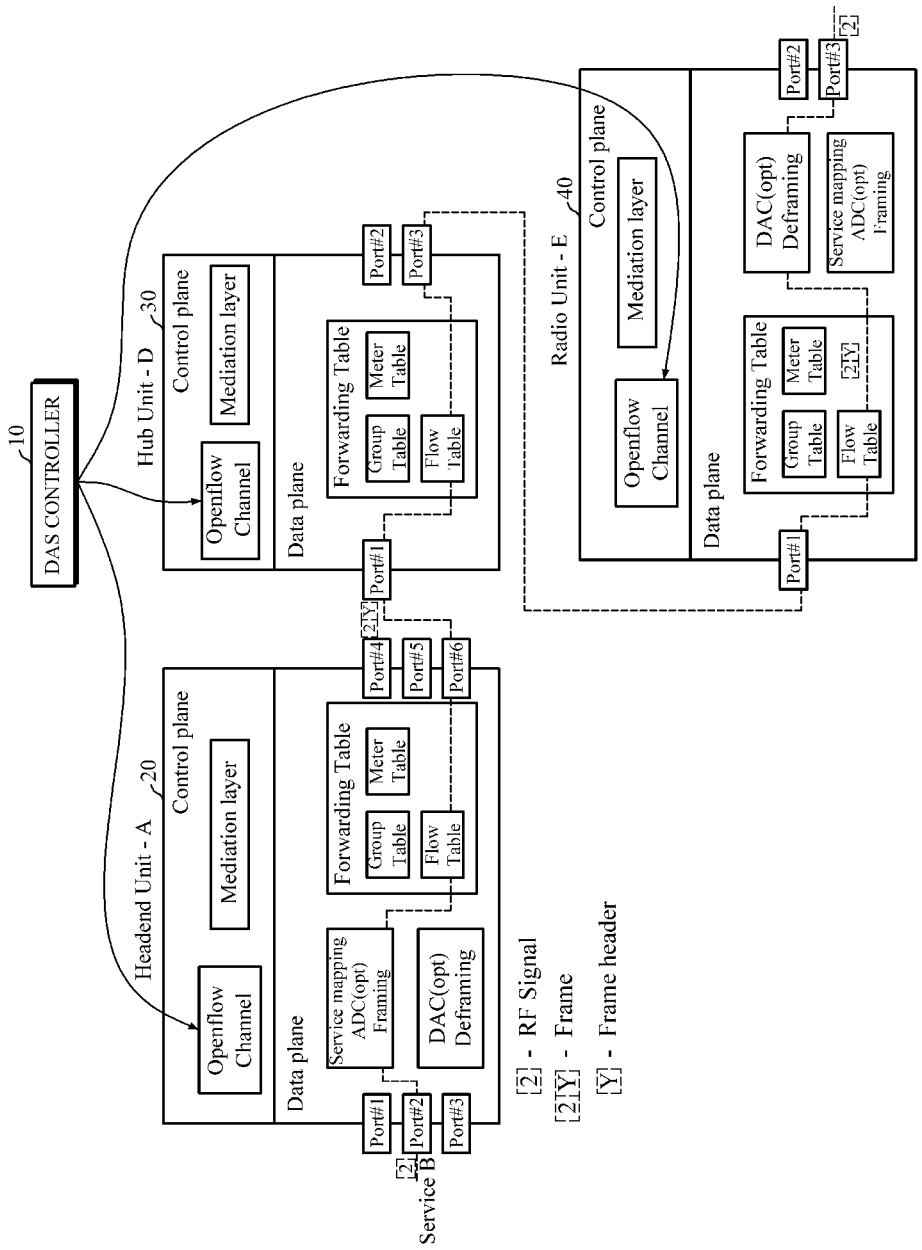
FIG. 8B is a diagram showing an example of policy change and corresponding traffic transmission of a distributed antenna system according to yet another embodiment.

FIGS. 8A and 8B are a diagram showing an example of policy change and corresponding traffic transmission of a DAS according to yet another embodiment, and FIG. 9 is a table showing an example of policy information, which is set for the policy change and the traffic transmission, with respect to the DAS unit shown in FIGS. 8A and 8B.

It is assumed that the policy information of the DAS unit, which is set as the table shown in FIG. 7 through the process shown in FIG. 5, is no longer needed for "Service B" in the RU C and is needed for an RU E, and the policy is changed.

An example in which traffic transmission in a downlink direction of a DAS is different from the traffic transmission of FIGS. 6 and 7 will be described with reference to FIGS. 8A, 8B, and 9.

First, an example of setting policy information of each unit will be described with reference to FIG. 9. An HEU A is a unit which performs framing. Policy information of the HEU A is stored in a service mapping and framing table and a forwarding table. Both the service mapping and framing table and the forwarding table include matching rules and actions. In the example of FIG. 9, the service mapping and framing table and the forwarding table are also composed of two entries as shown in FIG. 7.

In the service mapping and framing table of the HEU A of FIG. 9, when a service of the received traffic is classified and matches "Service A," a frame header with a destination tag which is set to "X" is added, and when the service matches "Service B," a frame header with a destination tag which is set to "Y" is added.

In the forwarding table of the HEU A of FIG. 9, when the destination tag of the frame header of the received frame matches "X," a corresponding frame is transmitted to an output port #4, and when the destination tag matches "Y," a corresponding frame is transmitted to an output port #6.

An HU B is a unit which does not perform framing. Policy information of the HU B is stored in a forwarding table. The forwarding table of the HU B also includes matching rules and actions. Unlike the example of FIG. 7, the forwarding table is composed of one entry.

In the forwarding table of the HU B of FIG. 9, when an input port number of the received frame is "1" and a destination tag of the frame header matches "X," a corresponding frame is transmitted to an output port #3. Unlike the example of FIG. 7, the matching rule of the destination tag, "Y," is deleted. This is because an RU C connected to the HU B no longer needs "Service B," so it is deleted from the forwarding table under policy control of an OpenFlow controller.

The RU C is a unit which performs framing and performs deframing in a downlink, and thus only policy information stored in a forwarding table is shown in the drawing. The forwarding table of the RU C also includes matching rules and actions. Unlike the example of FIG. 7, the forwarding table is composed of one entry.

In the forwarding table of the RU C of FIG. 9, when an input port number of the received frame is "1" and a destination tag of the frame header matches "X," a corresponding frame is transmitted to an output port #2. Unlike the example of FIG. 7, the matching rule of the destination tag, "Y," is deleted. This is because the RU C connected to the HU B no longer needs "Service B," so it is deleted from the forwarding table under the policy control of the OpenFlow controller.

An HU D is a unit which does not perform framing. Policy information of the HU D is stored in a forwarding table. The forwarding table of the HU D also includes matching rules and actions. In the example of FIG. 9, the forwarding table is composed of one entry.

In the forwarding table of the HU D of FIG. 9, when an input port number of the received frame is "1" and a destination tag of the frame header matches "Y," a corresponding frame is transmitted to an output port #3. Unlike the example of FIG. 7, the matching rule of the destination tag, "Y," is added to the HU D. This is because an RU E connected to the HU D needs "Service B," so it is added to the forwarding table under the policy control of the OpenFlow controller.

The RU E is a unit which performs framing and performs deframing in a downlink, and thus only policy information stored in a forwarding table is shown in the drawing. The forwarding table of the RU E also includes matching rules and actions. In the example of FIG. 9, the forwarding table is composed of one entry.

In the forwarding table of the RU E of FIG. 9, when an input port number of the received frame is "1" and a destination tag of the frame header matches "Y," a corresponding frame is transmitted to an output port #3. Unlike the example of FIG. 7, the matching rule of the destination tag, "Y," is added to the HU D. This is because the RU E connected to the HU D needs "Service B," so it is added to the forwarding table under the policy control of the OpenFlow controller.

Referring to FIG. 8A based on the configuration of the table shown in FIG. 9, first, the HEU A receives an RF signal corresponding to "Service A" from a macro base station. In FIG. 8A, the received RF signal is indicated by a box #1.

Service mapping and framing are performed in a data plane 300 of the HEU A. Therefore, a service mapped to the service of the received RF signal is searched for in the matching rules in the service mapping and framing table. As shown in table of FIG. 9, since the service matches "Service A" of a first entry, the received RF signal is used as frame data and the destination tag of the frame header is set as "X" to perform framing. In this case, the source tag and the vendor specific information are also included in the frame header, and a description of the routing process will be omitted.

The data plane 300 of the HEU A performs framing on the received RF signal and then searches for a matching rule in the forwarding table using a value of the destination tag of the frame header. According to FIGS. 8A and 9, since the destination tag of the frame is composed of "X," the value of the destination tag of the frame matches the first entry of the forwarding table. Therefore, the data plane 300 transmits the corresponding frame to an output port #4, which is the value stored in the action.

The data plane 300 of the HU B searches for a matching rule in the forwarding table using the input port number of the received frame and the value of the destination tag of the frame header as keywords. According to FIGS. 8A and 9, since the input port number of the received frame is "1" and the destination tag of the frame is "X," the value of the destination tag of the frame matches the first entry of the forwarding table. Therefore, the data plane 300 transmits a corresponding frame to the output port #3, which is the value stored in the action.

The data plane 300 of the RU C searches for a matching rule in the forwarding table using the input port number of the received frame and the value of the destination tag of the frame header as keywords. According to FIGS. 8A and 9, since the input port number of the received frame is "1" and the destination tag of the frame is "X," the value of the destination tag of the frame matches the first entry of the forwarding table. Therefore, the data plane 300 transmits a corresponding frame to the output port #2, which is the value stored in the action.

Further, an RF signal of a box #2, which is another example of the downlink, will also be described. The HEU A receives an RF signal corresponding to "Service B" from the macro base station through a port #2. In FIG. 8B, the received RF signal is indicated by the box #2.

Service mapping and framing are performed in the data plane 300 of the HEU A. Therefore, a service mapped to the service of the received RF signal is searched for in the matching rules in the service mapping and framing table. As shown in table of FIG. 9, since the service matches "Service B" of a second entry, the received RF signal is used as frame data and the destination tag of the frame header is set as "Y" to perform framing.

The data plane 300 of the HEU A performs framing on the received RF signal and then searches for a matching rule in the forwarding table using a value of the destination tag of the frame header. According to FIGS. 8B and 9, since the destination tag of the frame is composed of "Y," the value of the destination tag of the frame matches the second entry of the forwarding table. Therefore, the data plane 300 transmits a corresponding frame to an output port #6, which is the value stored in the action.

The data plane 300 of the HU D searches for a matching rule in the forwarding table using the input port number of the received frame and the value of the destination tag of the frame header as keywords. According to FIGS. 8B and 9, since the input port number of the received frame is "1" and the destination tag of the frame is "Y," the value of the destination tag of the frame matches the first entry of the forwarding table. Therefore, the data plane 300 transmits the corresponding frame to the output port #3, which is the value stored in the action.

The data plane 300 of the RU E searches for a matching rule in the forwarding table using the input port number of the received frame and the value of the destination tag of the frame header as keywords. According to FIGS. 8B and 9, since the input port number of the received frame is "1" and the destination tag of the frame is composed of "Y," the value of the destination tag of the frame matches the first entry of the forwarding table. Therefore, the data plane 300 transmits the corresponding frame to an output port #3, which is the value stored in the action.

Although not shown in FIGS. 6 to 9, the process of transmitting the traffic may be divided into two patterns. A first pattern is a case in which a forwarding table for processing a corresponding frame is set in the data plane 300 of each DAS unit, and the corresponding frame may be transmitted according to a predetermined action. A second pattern is a case in which a forwarding table for processing a corresponding frame is not set in the data plane 300 of each DAS unit. In this case, the DAS unit temporarily stores the corresponding frame in a buffer and queries an appropriate routing policy to the controller. The controller instructs to establish the appropriate routing policy and update the forwarding table. When the DAS unit updates the forwarding table, the frame stored in the buffer is transmitted according to the determined action. As another example, the corresponding frame may be discarded.

According to the present invention, in order to change a traffic transmission policy, it is possible to quickly and efficiently set or change the traffic transmission policy through an integrated SDN supporting application without changing the setting in each unit of the DAS.

Further, it is possible to dynamically change the traffic transmission policy according to a status of each unit and a status of a port as well as the traffic transmission policy by an operator.

Further, since a standard-based protocol is used, interoperability with other vendors' products using a standard protocol can be enhanced.

Furthermore, an OpenFlow based management framework that can be simultaneously applied to both radio traffic and Ethernet traffic can be provided.

While the present invention has been described with reference to the embodiments and drawings, the present invention is not limited thereto. It should be understood that various modifications from the embodiments may be apparent to those skilled in the art. Appended claims are intended to include such modifications.

What is claimed is:

1. An OpenFlow based distributed antenna system (DAS) policy routing method comprising:
    classifying, by a DAS unit, a service of traffic received through an input port of the DAS unit into a macro fronthaul service and a Smallcell or WiFi backhaul service, and performing framing according to the classified service;
    extracting, by the DAS unit, a match field from header information of a received frame; and
    comparing, by the DAS unit, the extracted match field with a matching rule of a forwarding table to route according to a matching traffic transmission policy and output a frame to an output port of the DAS unit,
    wherein the DAS unit includes a control plane and a data plane,
    wherein the control plane is configured to receive the traffic transmission policy from a DAS controller and set transmission policy of the data plane,
    wherein the data plane is configured to transmit traffic received through the input port of the DAS unit to the output port based on the received traffic transmission policy, and
    wherein the data plane of the DAS unit supports only the traffic transmission function of a vendor's own specification, and the DAS unit maps and set the OpenFlow based traffic transmission policy to the traffic transmission policy of the vendor's own specification of the DAS unit.

2. The OpenFlow based DAS policy routing method of claim 1, wherein the traffic transmission policy is a policy applied to radio traffic or Ethernet traffic.

3. The OpenFlow based DAS policy routing method of claim 1, further comprising performing deframing before the outputting of the frame to the output port performed by the DAS unit.

4. The OpenFlow based DAS policy routing method of claim 1, wherein the traffic transmission policy is dynamically changed by the DAS controller based on a status of the DAS unit.

5. The OpenFlow based DAS policy routing method of claim 1, further comprising querying the DAS controller for an appropriate routing policy when the matching rule is not found.

6. An apparatus, comprising:
    a memory; and
    a processor which is configured, when executing program instructions stored in the memory, to perform operations of:
    classifying, by a DAS unit, a service of traffic received through an input port of the DAS unit into a macro fronthaul service and a Smallcell or WiFi backhaul service, and performing framing according to the classified service;
    extracting, by the DAS unit, a match field from header information of a received frame; and
    comparing, by the DAS unit, the extracted match field with a matching rule of a forwarding table to route according to a matching traffic transmission policy and output a frame to an output port of the DAS unit, wherein the DAS unit includes control plane and data plane, wherein the control plane is configured to receive the traffic transmission policy from a DAS controller and set transmission policy of the data plane, wherein the data plane is configured to transmit traffic received through the input port of the DAS unit to the output port based on the received traffic transmission policy, and wherein the data plane of the DAS unit supports only the traffic transmission function of a vendor's own specification, and the DAS unit maps and set the OpenFlow based traffic transmission policy to the traffic transmission policy of the vendor's own specification of the DAS unit.

7. The apparatus of claim 6, wherein the traffic transmission policy is a policy applied to radio traffic or Ethernet traffic.

8. The apparatus of claim 6, wherein the processor is further configured to perform deframing before the outputting of the frame to the output port performed by the DAS unit.

9. The apparatus of claim 6, wherein the traffic transmission policy is dynamically changed by the DAS controller based on a status of the DAS unit.

10. The apparatus of claim 6, wherein the processor is further configured to perform querying the DAS controller for an appropriate routing policy when the matching rule is not found.

* * * * *